: US008806547B2

(12) United States Patent
Mace et al.

(10) Patent No.: US 8,806,547 B2
(45) Date of Patent: Aug. 12, 2014

(54) VIRTUAL MULTIMEDIA MATRIX OVER PACKET SWITCHED NETWORK

(75) Inventors: Gael Mace, Langan (FR); Jean Le Roux, Cesson-Sévigné (FR); Patrick Hardy, Baulon (FR)

(73) Assignee: Thomson Licensing, Boulogne, Billancourt (FR)

( * ) Notice: Subject to any disclaimer, the term of this patent is extended or adjusted under 35 U.S.C. 154(b) by 1179 days.

(21) Appl. No.: 12/450,260

(22) PCT Filed: Mar. 17, 2008

(86) PCT No.: PCT/EP2008/053180
§ 371 (c)(1), (2), (4) Date: Sep. 23, 2011

(87) PCT Pub. No.: WO2008/113791
PCT Pub. Date: Sep. 25, 2008

(65) Prior Publication Data
US 2012/0062801 A1    Mar. 15, 2012

(30) Foreign Application Priority Data
Mar. 20, 2007 (EP) ................................... 07300880

(51) Int. Cl.
| H04N 7/173 | (2011.01) |
| H04L 29/06 | (2006.01) |
| H04N 21/647 | (2011.01) |
| H04N 21/44 | (2011.01) |
| H04N 21/234 | (2011.01) |
| H04N 5/268 | (2006.01) |
| H04L 12/56 | (2006.01) |

(52) U.S. Cl.
CPC ........ *H04L 65/601* (2013.01); *H04N 21/64784* (2013.01); *H04L 65/607* (2013.01); *H04L 49/355* (2013.01); *H04N 21/44016* (2013.01); *H04N 21/23424* (2013.01); *H04N 5/268* (2013.01); *H04L 49/602* (2013.01)
USPC .................................. 725/94; 725/39; 725/48

(58) Field of Classification Search
USPC ............................................... 725/39, 48, 94
See application file for complete search history.

(56) References Cited

U.S. PATENT DOCUMENTS

| 5,822,014 A * | 10/1998 | Steyer et al. ..................... 725/41 |
| 2005/0210138 A1 | 9/2005 | Zigmond et al. |
| 2006/0253532 A1 | 11/2006 | Kukoleca |
| 2009/0094650 A1 * | 4/2009 | Carmichael ..................... 725/92 |

FOREIGN PATENT DOCUMENTS

EP        1341359         9/2003

OTHER PUBLICATIONS

Search Report Dated June 6, 2008.

* cited by examiner

Primary Examiner — Hunter B Lonsberry
(74) Attorney, Agent, or Firm — Jeffrey D. Carter

(57) ABSTRACT

The present invention relates to a communication device comprising switching means in a packet switched networks, preferably in professional video production and broadcast environments. The present invention more particularly concerns a communication device in a packet-switched communication network, comprising means for:
  receiving streams provided by various sources;
  transmitting one or several streams selected from the set of incoming ones; comprising means for
  switching from a given set of incoming streams to a different set of outgoing streams, said switching being based on time based information and information concerning the structure of the manipulated streams.

The present invention also concerns a method of switching in a packet-switched communication network comprising a plurality of sources of data, a communication device and at least one destination device.

6 Claims, 6 Drawing Sheets

US 8,806,547 B2

VIRTUAL MULTIMEDIA MATRIX OVER PACKET SWITCHED NETWORK

This application claims the benefit, under 35 U.S.C. §365 of International Application PCT/EP2008/053180, filed Mar. 17, 2008, which was published in accordance with PCT Article 21(2) on Sep. 25, 2008 in English and which claims the benefit of European patent application No. 07300880.7, filed Mar. 20, 2007.

FIELD OF THE INVENTION

The present invention relates to the field of communication networks.

The present invention more particularly relates to a communication device comprising switching means in a packet switched networks, preferably in professional video production and broadcast environments.

BACKGROUND OF THE INVENTION

The OSI model, as shown on FIG. 1 and as standardized by the ISO organization, defines a networking framework for implementing communication means in seven layers.

As the layers 1 to 4 are in charge of the transport of the data over a given communication medium, layers 5 to 7 are used to allow different applications to communicate independently of the communication infrastructure used.

In terms of video switching, current video routers in the production environment shall be compliant with the SMPTE practice RP168 which defines a switching point and area such that the effects of any signal discontinuity in the chain are minimized, regardless of whether the interface is carrying an uncompressed television signal or a data signal.

Furthermore, all connected equipments are synchronized in phase and frequency thanks to a dedicated signal usually named "Genlock" or "Black Burst". As an example, the FIG. 2 shows the standardized format of the analogical Genlock signal.

From a video production operations point of view, in a studio, the director, thanks to action on various key of the video switcher, is able to control the video switching from different sources (camera, server, tape, etc.) to different destinations (DVE, monitor, production output, etc.), at a top A/V unit accuracy.

The underlying process, based on the ability of the video router to switch different video sources at top A/V unit accuracy, involves also a control/command step between the video switcher manipulating by the director and the video router, to provide features like
  List of available sources
  Accurate time indication when to switch from one video to another
  Duplication of one video on a set of output,
  Etc.

Lastly, such a service like video switching relies on a deep knowledge from the equipment of the structure of the manipulated essence to be able to determine accurate point and area in the stream.

IT network communication routing and switching operations are handled by two different kinds of network equipments:
  Network router:
  Routers are network devices that enable to propagate traffic over IP network. This functionality assesses that they are able to process OSI layer-3 information so as to be aware of logical address information. This is the mechanism called "routing".
  A router has a routing table that indicates, for a particular portion of logical addresses, where to route this traffic. Therefore, when a packet enters the router, its logical address is extracted and applied to the routing table to find the port where the packet must be forwarded.
  Network switch
  Switches are networks equipments that forward traffic on information contained in the layer-2 header. This is what is called "forwarding", in opposition to "routing" that defines operations on layer-3 information.
  Switches only forward traffic to the addressee. This is done by a forwarding table that associates a hardware address to a one of its port. On the receiving of a frame, the layer-2 header gives the hardware address and thus an associated entry in the forwarding table. The switch knows on which port to forward the frame.

Nevertheless, neither IT network routers nor IT network switches are designed to handle data related to layers upper than the OSI layer-4.

SUMMARY OF THE INVENTION

In a packet switched network and from a network infrastructure point of view, video switching service can only be handled at the applications level, because this means having a deep knowledge of the structure of the broadcasted essence to be able to determine accurate point and area in the stream.

Furthermore, even if new standards are emerging, like the ones promoted by the IEEE AVB (The Audio/Video Bridging Task Group is part of 802.1—the charter of the TG is to provide the specifications that will allow time-synchronized low latency streaming services through 802 networks) and IETF AVT (the Audio/Video Transport Working Group was formed to specify a protocol for real-time transmission of audio and video over unicast and multicast UDP/IP—this is the Real-time Transport Protocol, RTP, together with its associated profiles and payload formats) groups, in the IT world (by opposition of the professional video production one) to manage sensitive time application thanks to timestamp propagation and clock recovery mechanisms, core network element will never be able (or designed) to process operation (routing or forwarding) application data on a time based event. In the frame of the present invention: IT (Information technology) is the broad subject concerned with all aspects of managing and processing information in computers technology. This usually refers to the non real-time world of computers processing, in opposition with dedicated technologies that are specially designed for real-time uses.

The term of matrix relates to the current operations that allow such as real time top A/V unit accurate clean switch (RP168) and seamless switch services.

Beyond the ability to transport the multimedia essence, the current audio/video routers are aware of the structure of the essence they are manipulating and also, thanks to accurate synchronization, the time relation between several incoming sources.

In its broader sense, the present invention concerns a communication device in a packet-switched communication network, comprising means for:
  receiving streams provided by various sources;
  transmitting one or several streams selected from the set of incoming ones;
characterized in that it comprises means for switching from a given set of incoming streams to a different set of outgoing streams, said switching being based on time based information and information concerning the structure of the manipulated streams.

Preferably, said communication device comprises means for receiving external commands for In/Out streams' set identification, time synchronization and switching time event notification Advantageously, said communication device comprises means for transmitting at least current operation status.

According to an embodiment, said accurate time based information is provided by an implementation of the IEEE 1588 standard.

Preferably, said communication device comprises means for handling dedicated application protocols corresponding to OSI layers 5 to 7.

According to an embodiment, said switching takes place at specific times, such as the A/V units borders like picture or audio frame.

The present invention also concerns a method of switching in a packet-switched communication network comprising a plurality of sources of data, a communication device (CD) and at least one destination device (DD), characterized in that it comprises the steps of:
  registering by each of the plurality of sources of data to the communication device (CD);
  maintaining by the communication device (CD) of a list of all sources of data registered to said communication device (CD);
  communicating by said destination device (DD) to said communication device (CD) of a request comprising a list of data streams from sources of data that said destination device (DD) requests to receive from these sources of data through said communication device (CD);
  verifying of the validity of the request from said destination device (DD) in terms of bandwidth that is necessary for the routing of data streams to said communication device (CD) and then to said destination device (DD);
and in that, if the step of verifying is positive, said source streams are transmitted by said sources of data, processed by said communication device (DD) and transmitted to said destination device (DD).

Preferably, said registering step comprises communicating an IP multicast address of the data source to said communication device (D).

Advantageously, said destination device (DD) declares a logical identifying element of the stream resulting from the combination/processing done by said communication device (CD).

According to an embodiment, said destination device (DD) indicates a list of IP multicast addresses of the source streams, the IP multicast address and the UDP port number (one per source stream) for the resulting stream.

Preferably, said method comprises a further step of notifying, by said destination device, said communication device (CD) of a change in the list of source streams that it requests to receive.

Advantageously, the step of notifying comprises communicating the time (date), at which said change takes places.

According to an embodiment, said communication device (CD) shares with said destination device (DD) a common time base resulting from their mutual synchronization.

Preferably, said step of notifying of a change is followed by a validity check in terms of necessary resources implied by said change in the list of source streams.

According to an embodiment, following said step of notifying of a change, said communication device (CD) operates the change and transmits an additional source stream to said destination device (DD).

BRIEF DESCRIPTION OF THE DRAWINGS

The following detailed description will be better understood with the drawings, in which.

DETAILED DESCRIPTION OF THE INVENTION

As an example of packet switched network, the detailed description below is based on an Ethernet/IP local network infrastructure as it could be deployed for a professional video production facility.

However, it should be noted that equivalent features could be implemented on other type of network infrastructure as it could be found also in WAN environment.

As presented previously, off-the-self core network devices are not able to handle the multimedia switching feature at top A/V unit accuracy.

However, such a feature is mandatory in a studio production. So the following question rises immediately: how and where handle it?

Figure 4:
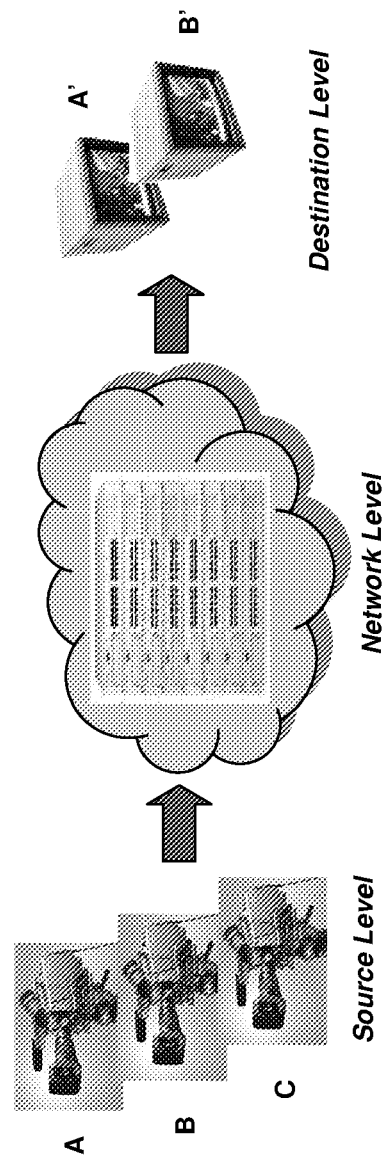
FIG. 4 illustrates the video switching location on an Ethernet/IP network.

At the Audio/Video sources level, it's impossible from an operation point of view due to the fact that the same stream could be sent simultaneously to different destinations but not during the same period of time. So, as depicted by the FIG. 4, stop the source A to allow the destination A' switching from source A to B, will penalize the destination B' that expects to receive continuously the source A.

At the core network level, it seems also not to be a relevant solution as long as off-the-shelf core network equipments are not designed to handle such features.

At the Audio/Video destination level, it is possible for some categories of video/audio equipment, which are complex enough to manage simultaneously several incoming streams and to switch from one source to another. If the I/Os module of a video switcher is already designed in this way, it's absolutely not the case for a simple monitor.

Figure 1:
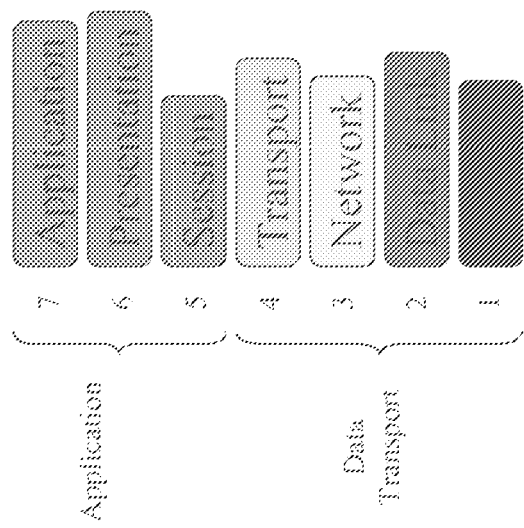
FIG. 1 shows the OSI Model.
Figure 2:
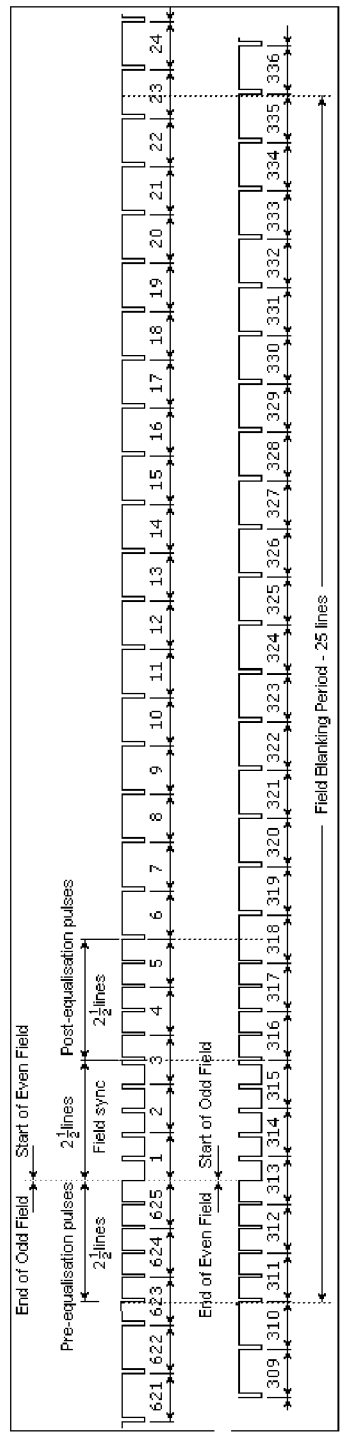
FIG. 2 represents an Analogical Genlock signal.
Figure 3:
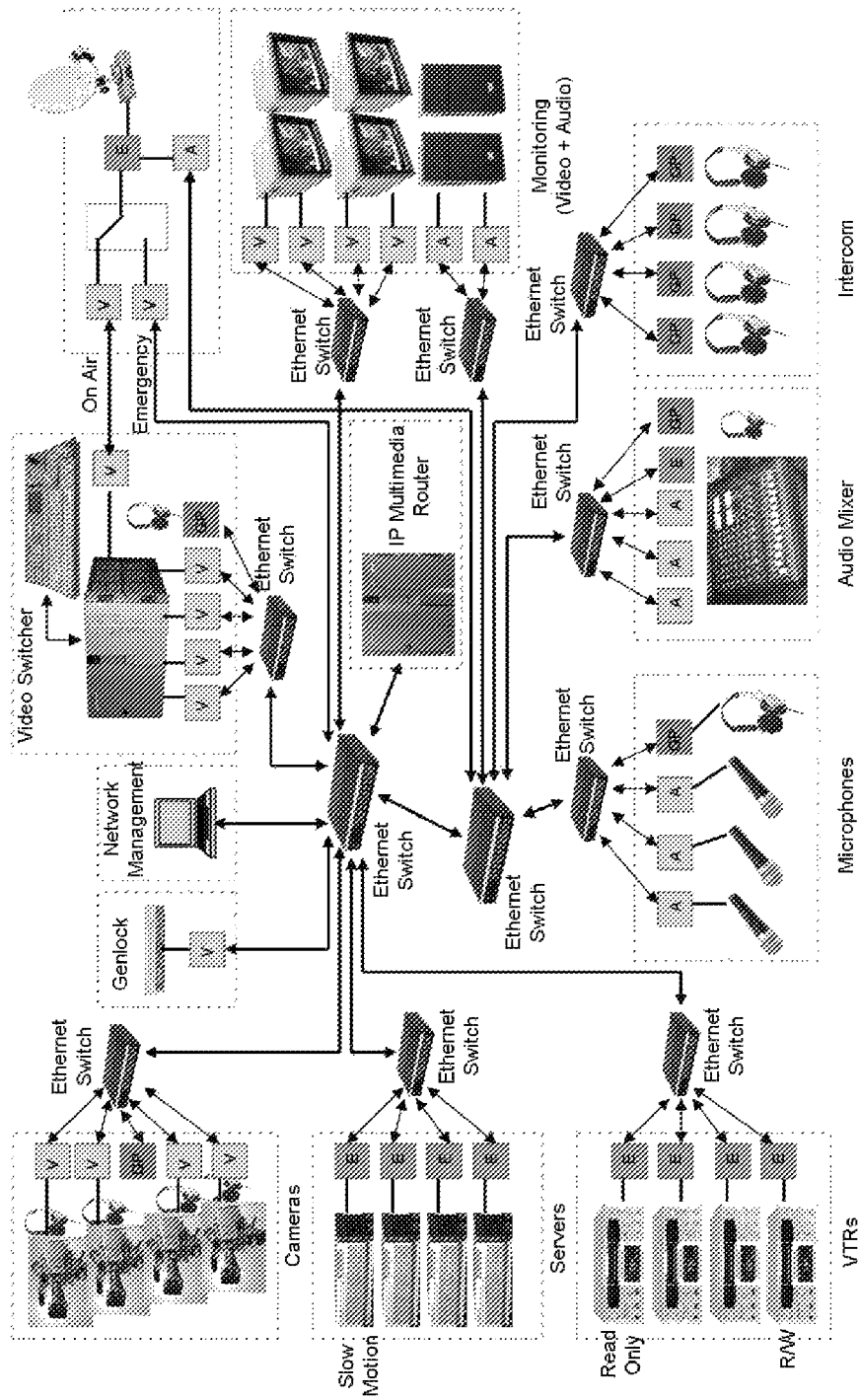
FIG. 3 illustrates an Ethernet/IP networked studio production infrastructure.

All these reasons converge on the use of a dedicated device as depicted in FIG. 3 and identify under the name "IP Multimedia Router" which shall handle the multimedia switching.

From a studio network management perspective, it shall be mandatory to build dynamic combinations of sources and destinations. The term "dynamic" highlights the fact that such combinations could be modified during the production in accordance with the needs of the studio director.

The source/destination combinations change shall occur at A/V unit accuracy.

As an example, the following structures defines, at least partially, in a C/C++ manner the data structure used by a studio network management entity to initialize the IP Video Router thanks an Ethernet/IP protocol.

```
Typedef Node_ID            // could be the Ethernet MAC address or any StreamID
                           //    as used in the RSVP/MPLS protocol or the future
                           //    SRP protocol
Typedef Timestamp          // based on accurate time representation (nanosecond unit
                           //    as used in the IEEE1588 standard)
Struct Video_Switching     {
   Node_ID    Destination;   // Destination of the video switching
                             //    output
   Node_ID    *Source;       // List of the input sources of the video
                             //    switching
   TimeStamp  TimeSwitching;
}
```

The protocol description used to transmit this structure could be either binary (like RTP) or textual (like HTTP).

The choice of the use of a synchronization solution depends on precision criteria (time for converging, drift in comparison with the master clock, . . . ). Some synchronization solutions that could be used in the frame of the present invention are: NTP, SNIP, IEEE 1588 . . . .

The switching operations take place at specific times, such as the A/V units borders like picture or audio frame. The knowledge of the audio and/or video stream allows to know the size of these units, as it is the case in a SD video stream (270 Mb/sec) and a HD video stream (1.5 Gb/sec) in terms of number of points per line.

Figure 5:
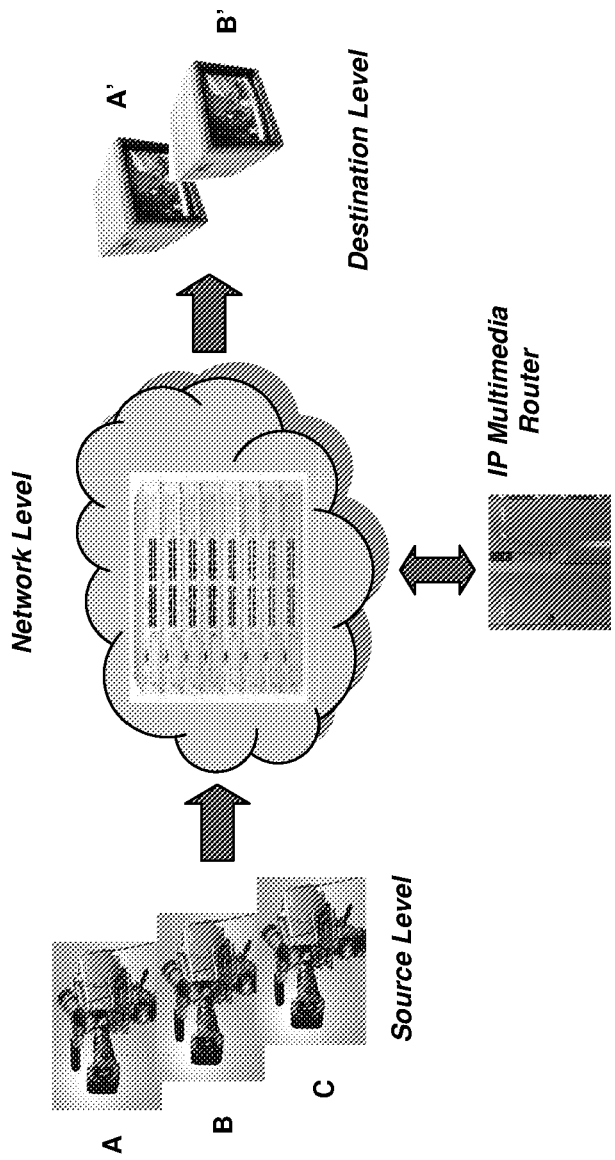
FIG. 5 shows an IP Multimedia Router according to the present invention.

The multimedia switching feature over an Ethernet/IP network requires the use of a new device, the IP Video router as depicted in the FIGS. 3 and 5.

Figure 6:
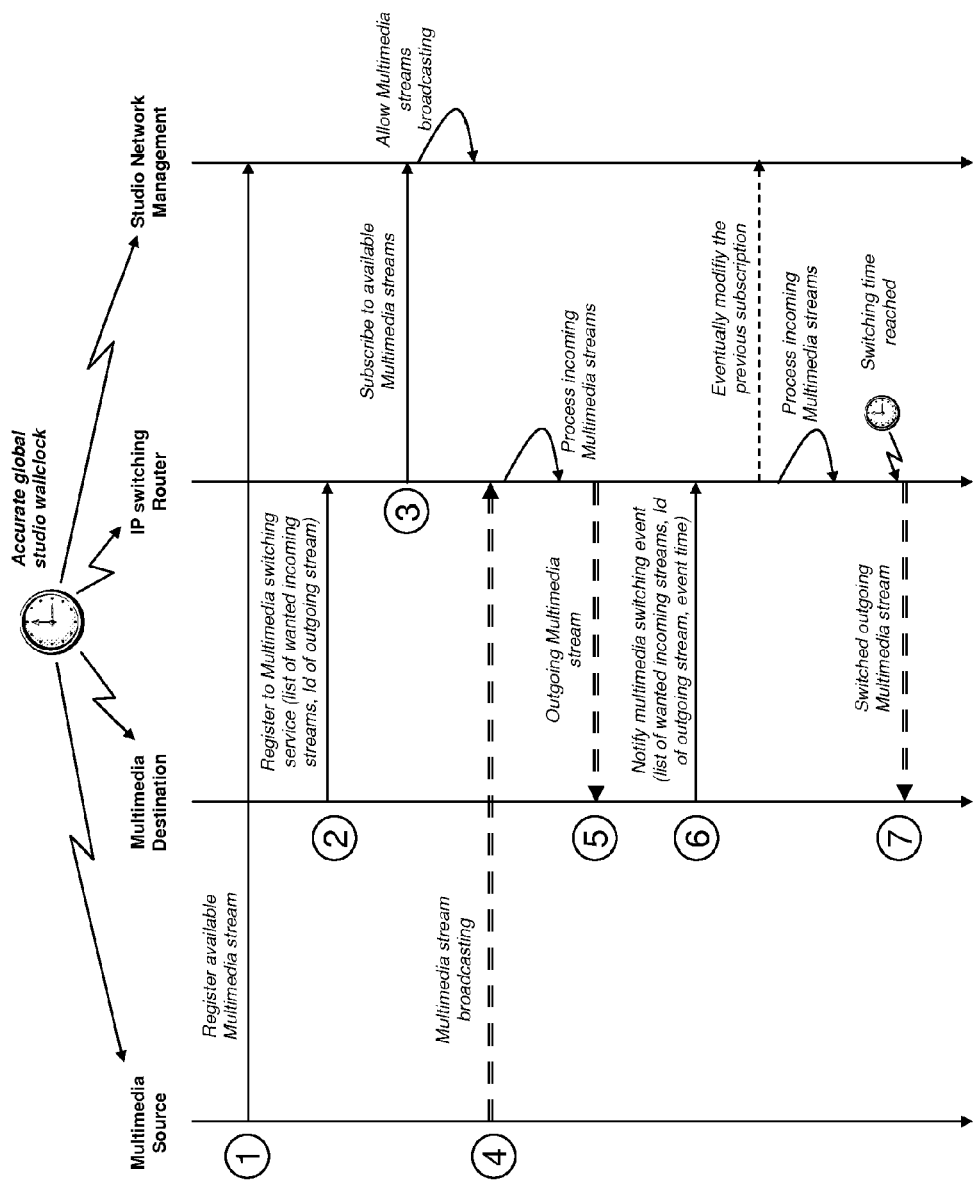
FIG. 6 represents IP video switching operations.

As an example, FIG. 6 describes the temporal synopsis of the controls/commands exchanged between the destination devices, the source devices, the IP Multimedia Router and the studio network management.

FIG. 6 represents IP video switching operations. The following operation steps references are the ones from FIG. 6:
1. Each source of multimedia data registers on the IP video router that keeps an up-to-date list of all available stream sources. This declaration can for instance comprise the IP multicast address of the source stream.
2. Each client (destination) declares the list of all sources that it wishes to receive from the IP video router, and the logical identifying element of the stream resulting from the combination/processing done by the IP video router. It indicates for instance the list of IP multicast addresses of the source streams, the IP multicast address and the UDP port number (one per source stream) for the resulting stream.
3. Verifying of the validity of the client request in terms of bandwidth that is necessary for the routing of the source streams to the IP video router and the resulting stream to the client.
4. After validation, the source streams are transmitted by the sources and processed by the IP video router.
5. And the resulting stream is transmitted to the client.
6. At each time, the client can notify the IP video router of any change in the list of source streams that it wishes to receive. This notification also comprises the time (date), at which this change must take place. The IP video router shares with the client a common time base resulting from their mutual synchronization. With each notification, there is a validity check of the request in terms of necessary resources.
7. At the time previously notified by the client, the IP video router operates the change as defined on the resulting stream and transmits it to the client.

The way how the overall studio management is done, is out of scope of the present document. However, as indication:

The global studio time synchronization could be handled with such mechanisms as promoted by the IEEE AVB (see above) and IETF AVT (see above) standardization group.

Multimedia streaming management over an Ethernet/IP network could be handled thanks to VLAN (IEEE 802.1Q: Virtual Bridged Local Area Networks), multicast/unicast traffic (IP Multicast: IP multicast is a point-multi-point addressing mechanism), IGMP (The Internet Group Management Protocol is a communications protocol used to manage the membership of Internet Protocol multicast groups), SRP, etc.

The above specification, examples and drawings provide a complete description of the method according to the present invention. Since many embodiments of the invention can be made without departing from the spirit and scope of the invention, the invention resides in the claims herein after appended.

The invention claimed is:

1. A switching device in a packet-switched communication network, said switching device comprising hardware for:
   receiving by said switching device a request for a first set of audio/video streams provided by a first set of sources from a client device, synchronized with said switching device on a common time base;
   receiving said requested first set of streams from said first set of sources;
   transmitting said first set of streams to said client device;
   receiving by said switching device a notification from said client device requesting a change of said first set of streams at a determined time, said change comprising a switching from said first set of streams provided by said first set of sources to a second set of streams provided by a second set of sources; and
   executing said requested change at said determined time.

2. The switching device according to claim 1, wherein said common time base is provided by an implementation of the IEEE 1588 standard.

3. A method of switching in a packet-switched communication network comprising a plurality of sources of streams, a switching device and at least one client device, said method comprising steps of:
   receiving by said switching device a request for a first set of audio/video streams provided by a first set of sources from a client device, synchronized with said switching device on a common time base;
   receiving said requested first set of streams from said first set of sources;
   transmitting said first set of streams to said client device;
   receiving by said switching device a notification from said client device requesting a change of said first set of streams at a determined time, said change comprising a switching from said first set of streams provided by said first set of sources to a second set of streams provided by a second set of sources; and executing said requested change at said determined time.

4. The method according to claim 3, further comprising a step of verifying validity of said request in terms of bandwidth that is necessary for transmitting said requested first set of streams to said switching device and then to said client device.

5. The method according to claim 3, wherein said client device declares a logical identifying element of one of the streams resulting from processing done by said switching device.

6. The method according to claim 3, wherein said step of receiving said notification is followed by a validity check in terms of necessary resources implied by said change of said first set of streams.

* * * * *